(12) United States Patent
Sayeedi et al.

(10) Patent No.: US 7,221,670 B2
(45) Date of Patent: May 22, 2007

(54) APPARATUS AND METHOD FOR SUPPLYING INFORMATION CONCERNING PACKET DATA TO A BASE STATION

(75) Inventors: Shahab M. Sayeedi, Naperville, IL (US); Fei Xiong, Palatine, IL (US); Kim Sun Loh, Round Lake Beach, IL (US)

(73) Assignee: Motorola, Inc., Schaumburg, IL (US)

( * ) Notice: Subject to any disclaimer, the term of this patent is extended or adjusted under 35 U.S.C. 154(b) by 1094 days.

(21) Appl. No.: 10/212,821

(22) Filed: Aug. 6, 2002

(65) Prior Publication Data

US 2003/0031159 A1 Feb. 13, 2003

Related U.S. Application Data

(60) Provisional application No. 60/312,034, filed on Aug. 13, 2001.

(51) Int. Cl.
*H04B 7/216* (2006.01)

(52) U.S. Cl. ..................................... 370/342

(58) Field of Classification Search ............... 370/320, 370/331, 335, 342, 419, 426, 441, 496
See application file for complete search history.

(56) References Cited

U.S. PATENT DOCUMENTS

| | | | |
|---|---|---|---|
| 6,052,369 A | | 4/2000 | Hamalainen et al. |
| 6,845,236 B2* | | 1/2005 | Chang .................... 455/414.1 |
| 6,912,214 B2* | | 6/2005 | Madour et al. ............. 370/340 |
| 7,099,294 B2* | | 8/2006 | Sayeedi ..................... 370/335 |
| 2002/0068588 A1* | | 6/2002 | Yoshida et al. ............. 455/461 |
| 2002/0145990 A1* | | 10/2002 | Sayeedi ..................... 370/335 |
| 2003/0067921 A1* | | 4/2003 | Sivalingham ............... 370/394 |

FOREIGN PATENT DOCUMENTS

| | | |
|---|---|---|
| EP | 1 124 395 A1 | 8/2001 |
| WO | WO 00/76243 A1 | 12/2000 |
| WO | WO 01/80591 A2 | 10/2001 |
| WO | WO 02/093970 A1 | 11/2002 |

OTHER PUBLICATIONS

Inter-operability Specification (IOS) for CDMA2000 Access Network Interfaces: $A_{quater}$ Interface.

* cited by examiner

*Primary Examiner*—Chi Pham
*Assistant Examiner*—Thai Hoang

(57) ABSTRACT

An A.S0001/IS-2001 based Access Network for packet data has a base station (BS), a packet control function (PCF), and a packet data serving node (PDSN). If a BS/PCF connection fails to be achieved, this is communicated from the PDSN to the PCF by a message that identifies a reason for the failure to register selected from a plurality of possible reasons. A similar message is sent from the PCF to the BS informing the BS of the reason for the failure to register. If the PDSN/PCF interface is released after being connected, this is communicated from the PDSN to the PCF by a message that identifies the reason for the release selected from a plurality of possible reasons. A similar message is sent from the PCF to the BS so that the BS is informed of the reason for the release.

18 Claims, 3 Drawing Sheets

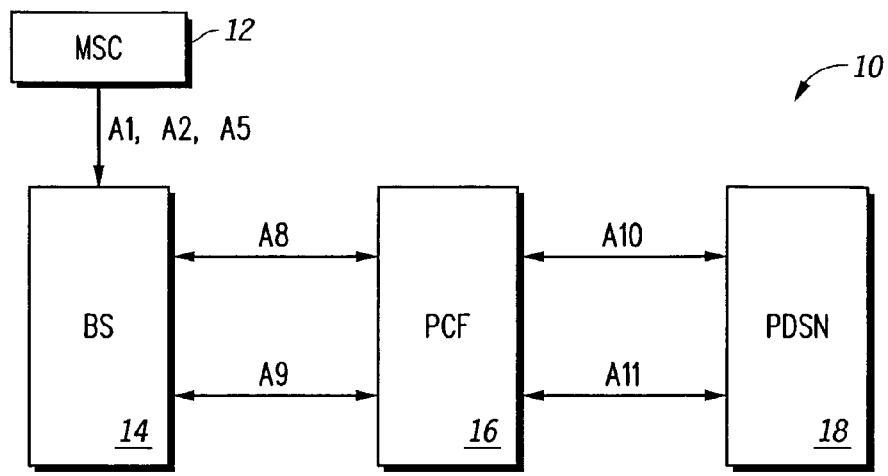

FIG.1

| A11<br>PDSN → PCF | A9<br>PCF → BS | A8/A10 |
|---|---|---|
| A11-REGISTRATION REPLY WITH PDSN CODE | A9-RELEASE-A8 COMPLETE WITH A9-PDSN CODE | NOT REGISTERED |
| A11-REGISTRATION UPDATE WITH PDSN CODE | A9-DISCONNECT-A8 WITH A9-PDSN CODE | RELEASED |

FIG.2

| 3.3 A9-DISCONNECT-A8 ||
|---|---|
| INFORMATION ELEMENT | AQUINTER SECTION REFERENCE |
| A9 MESSAGE TYPE | 4.2.13 |
| CALL CONNECTION REFERENCE | 4.2.10 |
| CORRELATION ID | 4.2.11 |
| MOBILE IDENTITY (IMSI) | 4.2.2 |
| MOBILE IDENTITY (ESN) | 4.2.2 |
| CON_REF | 4.2.14 |
| A8_TRAFFIC_ID | 4.2.16 |
| CAUSE | 4.2.3 |
| A9-PDSN CODE | 4.2.22 |

FIG.3

| 3.5 A9-RELEASE-A8 COMPLETE ||||||
|---|---|---|---|---|---|
| INFORMATION ELEMENT | AQUINTER SECTION REFERENCE | ELEMENT DIRECTION | TYPE ||
| A9 MESSAGE TYPE | 4.2.13 | PCF → BS | M ||
| CALL CONNECTION REFERENCE | 4.2.10 | PCF → BS | O | R |
| CORRELATION ID | 4.2.11 | PCF → BS | $O^a$ | C |
| CAUSE | 4.2.3 | PCF → BS | $O^{b,c}$ | C |
| A9-PDSN CODE | 4.2.22 | PCF → BS | $O^{c,d}$ | C |

FIG. 4

| 3.3 A11-REGISTRATION UPDATE ||
|---|---|
| INFORMATION ELEMENT | AQUATER SECTION REFERENCE |
| A11 MESSAGE TYPE | 4.2.2.154 |
| RESERVED <3 OCTETS> | NONE |
| HOME ADDRESS | 6.2.2.157 |
| HOME AGENT | 6.2.2.158 |
| IDENTIFICATION | 6.2.2.160 |
| SESSION SPECIFIC EXTENSION | 6.2.2.165 |
| REGISTRATION UPDATE AUTHENTICATION EXTENSION | 6.2.2.164 |
| NORMAL VENDOR/ORGANIZATION SPECIFIC EXTENSION(S) | 4.2.14 |

FIG. 5

| | |
|---|---|
| NORMAL VENDOR/ORGANIZATION SPECIFIC EXTENSION: TYPE = [86H] | 1 |
| LENGTH – <VARIABLE> | 2 |
| (MSB) RESERVED = [00 00H] | 3 |
| (LSB) | 4 |
| (MSB) | 5 |
| 3GPP2 VENDOR ID = 00 00 15 9FH | 6 |
| | 7 |
| (LSB) | 8 |
| APPLICATION TYPE = [06H] | 9 |
| APPLICATION SUB TYPE = [01H] | 10 |
| APPLICATION DATA (PDSN CODE) | 11 |

*FIG.6* ately after the corresponding figure.

APPARATUS AND METHOD FOR SUPPLYING INFORMATION CONCERNING PACKET DATA TO A BASE STATION

REFERENCE(S) TO RELATED APPLICATION(S)

The present application claims priority from provisional application, Ser. No. 60/312,034, entitled "APPARATUS AND METHOD FOR SUPPLYING INFORMATION CONCERNING PACKET DATA TO A BASE STATION," filed Aug. 13, 2001, which is commonly owned and incorporated herein by reference in its entirety.

FIELD OF THE INVENTION

This invention relates to field of mobile communication systems, and more particularly, to providing information concerning packet data to a base station.

BACKGROUND OF THE INVENTION

The TIA/EIA (Telecommunications Industry Association/ Electronic Industries Association) IS-2001, or IOS (3GPP2 A.S0001 Inter Operability Specification), standard provides a compatibility standard for cellular mobile telecommunications systems that operate as a cdma2000, 1XEV-DO or any other technology supported by an A.S0001/IS-2001 based Access Network. The standard ensures that a mobile station (MS) operating in a cdma2000 system can obtain communication services when operating in a cellular communication system or personal communication system (PCS) manufactured according to the standard. To ensure compatibility, radio system parameters and call processing procedures are specified by the standard, including call processing steps that are executed by an MS and a base station serving the MS in order to establish a call and digital control messages and analog signals that are exchanged between elements of an infrastructure that includes the base station.

A typical cdma2000 communication system infrastructure includes a base station in communication with a Packet Control Function (PCF). An interface between the base station and the PCF includes an A9 interface that provides a signaling interface between the base station and the PCF and an A8 interface that provides a bearer path between the base station and the PCF. These interfaces are collectively known in the IS-2001, or IOS, standard as the Aquinter or A8/A9 interface. The infrastructure also includes a Packet Data Serving Node (PDSN) in communication with the PCF. The PDSN routes MS originated or terminated packet data traffic. An interface between the PCF and the PDSN includes an A11 interface that provides a signaling interface between the PCF and the PDSN and an A10 interface that provides a bearer path between the PCF and the PDSN.

The base station receives packet data from a mobile station and sends it to the PDSN over the A8 and A10 bearer interfaces. Prior to actually performing this data transmission there must be a connection established on these A8 and A10 bearer interfaces. If such a connection is not made, the base station is informed of that and the packet data call fails. The Network Operator may be in a position to correct the problem, but without the information necessary to know what to do to overcome the problem, this is very difficult to achieve. Further, the base station operator may be able to improve the system for better likelihood of making connection in the future, but such improvements are difficult without good information as to why the connections were not successful. Thus, there is a known need to provide the reason to the base station for a failure to register.

Additionally, sometimes a connection is successfully made, but then released to make the resource available for other calls. The release may be as designed, such as a time out feature, or it may be an undesirable release due to some error condition. The base station is informed of the release, but the information as to why the release came about may not be available. The result is that the base station operator is not apprised of where the problems are arising and thus deprived of knowledge of how to improve the system to avoid the problem in the future.

BRIEF DESCRIPTION OF THE DRAWINGS

The present invention is illustrated by way of example and not by limitation in the accompanying figures, in which like references indicate similar elements, and in which:

FIG. 1 shows a communication system useful in performing the method of the invention;

FIG. 2 is a table showing features of certain messages according to the invention;

FIG. 3 is a table showing elements of a first message according to an embodiment of the invention;

FIG. 4 is a table showing elements of a second message according to an embodiment of the invention;

FIG. 5 is a table showing elements of a third message according to an embodiment of the invention; and FIG. 6 is a table showing details of one of the elements of the third message.

DESCRIPTION OF THE INVENTION

In communications systems, as an improvement to the present IOS standard, a base station receives useful information that is not currently available to the base station under the standard. The base station is coupled to one functional block that is in turn coupled to a second functional block. When these blocks cannot be setup (registered) for transferring packet data, then the block coupled to the base station, according to an embodiment of the invention, provides a reason, selected from a plurality of possible reasons, to the base station. When the blocks are setup for transferring packet data but become disconnected, then the base station, also according to an embodiment of the invention, is informed of the reason selected from a plurality of possible reasons why connected blocks could be become disconnected. Existing messages under the IOS standard are improved so that the base station can receive this useful information.

Shown in FIG. 1 is a communication system 10, which is a A.S0001/IS-2001 based Access Network, useful in transferring a packet data from a mobile source such as a cell phone to a packet information system such as the internet. System 10 comprises a mobile switching center (MSC) 12, a base station (BS) 14, a packet control function (PCF) 16, and a packet data serving node (PDSN) 18. MSC 12 switches mobile originated and mobile terminated traffic and interfaces with base station 14 using A1, A2 and A5 interfaces according to the IOS standard. Base station 14 receives data and voice via a mobile station such as a cell phone. PCF 16 interfaces with BS 14 to prepare the data for use by PDSN 18. PCF 16 interfaces with BS 14 using A8 and A9 interfaces. PCF 16 interfaces with PDSN 18 using the A10 interface and the A11 interface. The A9 interface is the signal interface for providing control information between BS 14 and PCF 16. Similarly, the A11 interface provides signal information between PCF 16 and PDSN 18. The A8 interface and the A10 interface are bearer lines that simply transfer data, packet data under the IOS standard. These names for the functional blocks BS 14, PCF 16, and PDSN 18 and the A8, A9, A10, and A11 are according to the IOS standard.

Table 20, shown in FIG. 2, depicts different messages for different conditions of the A8 and A10 interfaces that are present on the A11 interface and the A9 interface. In the cases present here the communication is from the PDSN 18 to PCF 16 and from PCF 16 to BS 14. As is presently the case there are four relevant messages for the not registered and released cases. The released case refers to the case in which packet data is permitted to be transferred on the A8 and A10 interfaces and then this permission is terminated. This then releases the A10 connection between PDSN and PCF 16 to become available for another user.

For the case when the packet data registration fails, two relevant messages are the A11-Registration Reply and the A9-Release-A8 Complete messages. The case of the A11-Registration Reply message provides information from PDSN 18 to PCF 16 that the A10 interface was not connected. Included in this message is information as to why that registration did not occur. This information is included in the Code element under the present IOS standard. The Code element as modified herein is called PDSN code. The information that is included with respect to registration by the current Code element under the current standard and the PDSN code is registration accepted, registration denied with the reason unspecified, registration denied with the reason being administratively prohibited, registration denied with the reason being insufficient resources, registration denied with the reason being mobile node failed authentication, registration denied with the reason being identification mismatch, registration denied with the reason being poorly formed request, registration denied with the reason being unknown PDSN address, registration denied with the reason being requested reverse tunnel unavailable, registration denied with the reason being reverse tunnel is mandatory and T (bit not set), and registration denied with the reason being unsupported vendor ID or unable to interpret data in the CVSE. The PDSN code has additional information to that of the Code element, comprising connection release-PDSN error, connection release-PPP timeout, connection release-inter-PCF handoff, connection release-inter PDSN handoff, connection release-PDSN OAM&P intervention, connection-release accounting error, Connection Release Registration Timeout, Connection Release Reason Unspecified. Others may also be available in the future.

With regard to the A9-Release-A8 Complete message, it provides information, as improved over the current IOS standard, that there is a failure to establish an A10 connection (the not registered case) due to a registration failure. This message, as shown in FIG. 2, also includes an A9-PDSN code. The A9-PDSN code is for the A9 interface and has information analogous and perhaps identical to the PDSN code information present in the A11 interface. With the A9-Release-A8 Complete message the base station is thus informed of the reason why there was a failure to establish the A10 connection. Accordingly, this information, by being available to the base station, can be utilized to either provide a correction so that a connection-can be made or to provide enhancements to the system in the future so that registrations can be made more consistently. If, for example, the error is because of a PDSN failure, the PCF may be reconnected to a different PDSN and the PDSN with the problem can then be fixed. Similarly, if there is a problem, for example with configuration or a software problem with base station 14, this is something that may be able to be fixed fairly quickly so that registrations can be made. Either way the problem is identified and solutions are discovered more quickly because of the base station receiving the reason for the failure to register.

Another situation that has some similarity to the registration failure case but also has differences is the case in which the packet data connection exists (i.e., a PPP connection from the MS to the PDSN), but the PDSN initiates a release of the A10 connection. In such a case there are two relevant messages that are provided. The message shown in FIG. 2 from PDSN 18 to PCF 16 is the A11-Registration Update. This message allows the PDSN to initiate the release of the A10 connection. As shown in FIG. 2, this A11-Registration Update includes with it the PDSN code that provides reasons for release. Exemplary reasons for release are PPP timeout, PDSN error, PDSN reset, PDSN OAM&P intervention, inter-PDSN handoff, inter-PCF handoff, accounting error, registration timeout, reason unspecified, and insufficient resources. PPP timeout refers to a lack of usage of the mobile user and thus a timeout occurs. PDSN error refers to a something in the PDSN detecting an error or simply failing to maintain the connection. PDSN reset refers to the PDSN being reset. The OAM&P (Operations, Administration, Maintenance, and Performance) intervention refers to operator maintenance Inter PDSN handoff refers to a handoff of the packet data session to another PDSN. Inter PCF handoff refers to handoff off of the call to another PCF. Accounting error refers to invalid accounting records. Insufficient resources refers to lack of resources within the PDSN or lack of A10 resources. Reason unspecified indicates that the PDSN sent reason not specified or did not include a code. Registration timeout refers to failure to reregister prior to expiration of the Trp timer.

Another message is A9-Disconnect-A8 message from the PCF to the BS that requests to release the A8 connection. The A9-Disconnect-A8 also includes the A9-PDSN code transmitted to the base station. The code and the A11-Registration Update message allow the A9-Disconnect-A8 message to have the information related to the cause of the A10 connection release so that it can be transmitted to the base station.

Thus base station 14 can be aware of any abnormal behavior occurring in the Access Network. Also there may be information about a failure that has occurred that may be indications of a need for repair. It is also an information gathering opportunity for the base station operator to indicate a particular need for a future improvement in the system. The base station operator would thus have a basis for directing resources for these future improvements. The A9-Release-A8 Complete message, the A11-Registration Update message, and the A9-Disconnect-A8 message are all existing messages in the IOS standard, but they did not previously have the PDSN or A9-PDSN codes. The result being the base station did not have information as to the reason for the registration failure or the reason for the release of an existing A10 connection.

Shown in FIG. 3 is a table for the A9-Disconnect-A8 message that is defined in section 3.3 of $A_{quinter}$ specification. This shows that the A9-Disconnect-A8 message as improved includes the A9-PDSN code. This also shows where the definition of this is provided under the improved specification. The A9-Disconnect-A8 message comprises the A9 message type element, call connection reference element, correlation ID element, mobile identity (IMSI) element, mobile identity (ESN) element, con_ref element, the A8_traffic_ID element, cause element, and the new A9-PDSN code element. If the correlation ID element is included in the message, its value shall be returned in the corresponding element in the A9-Release-A8 Complete message sent in response to this message. If there is a second occurrence of the mobile identity element and if it is included, it shall contain the ESN of the MS, which is, for example, the cell phone. Use of the ESN in this message is a network operator decision. Allowable cause values are packet called going dormant, equipment failure, normal call release, OAM &P intervention, PDSN resources unavailable. Also with respect to the cause element, if a PDSN failure code is available, the cause element is not included. With regard to the A9-PDSN code element, this element contains the PDSN failure code.

Shown in FIG. 4 is a table showing the elements of the A9-Release-A8 Complete message. In this case the A9-Release-A8 Complete message comprises the elements A9 message type, call connection reference, correlation ID, cause, and A9-PDSN code. With regard to correlation ID, this element shall only be included if it was also included in the A9-Release-A8 Complete message. This element shall be set to the value received in that message. With regard to a cause, allowable cause values are: PDSN resource unavailable, PCF resource unavailable, equipment failure, and OAM and P intervention. Also with regard to the cause element, if a PDSN failure code is available, the cause element is not included. With regard to the A9-PDSN code, this element contains the PDSN failure code.

With regard to the A11-Registration Update message, it-has the elements of all message type, reserved home address, home agent identification, session specific extension, registration update authentication extension, and normal vendor organization specific extensions. With regard to the field indicated as reserved 3 octets, this field is set to 0 by the PDSN 18 and ignored by the PCF 16. The normal vendor/organization specific extensions (NVSE) element is further defined as shown in FIG. 6. Shown in FIG. 6 is the technique used in the description of the standard for defining an element. Note in particular the new PDSN Code Application type Application Sub-Type and the element application data (PDSN code) is present. This carries the information concerning the reasons for the release event. Thus, the A-11-registration update message has the PDSN code. An alternative implementation would be for the A-11 registration update message to have the PDSN code as a stand-alone element instead of having it by way of the NVSE element. This arrangement of the ability to provide information to the base station is one that can easily be modified as further pieces of information need to be identified. With the presence of the PDSN code and the A9-PDSN code in these messages, the base station receives valuable information. Further, the PDSN code and the A9-PDSN code can conveniently be amended to achieve new information as that information is found to be desirable. Thus the convenient addition of an expandable and modifiable element into existing messages provides excellent flexibility for future improvements.

In the foregoing specification, the invention has been described with reference to specific embodiments. However, one of ordinary skill in the art appreciates that various modifications and changes can be made without departing from the scope of the present invention as set forth in the claims below. For example, the A11 Registration Reply message may be used instead of the A11-Registration Update message to provide the cause information for the "released" case to the PCF. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. In a packet data communication system comprising a base station, a Packet Control Function, a Packet Data Serving Node, wherein the base station is coupled to the packet control function by an A8 bearer interface and an A9 signaling interface and the packet control function is coupled to the packet data serving node by an A10 bearer interface and an A11 signaling interface, comprising:
   requesting an A8 connection;
   requesting an A10 connection and packet data registration in response to the step of requesting an A8 connection;
   providing an A11-Registration Reply message on the A11 signaling interface to indicate if the registration request is accepted and the A10 connection is completed; and
   providing an A9-Release-A8 Complete message on the A9 signaling interface to indicate to the base station that registration of the A10 bearer interface was denied including at least one reason selected from a plurality of reasons for denying registration.

2. The method of claim 1, wherein the A9-Release-A8 Complete message comprises an element having the plurality of reasons for denying registration.

3. The method of claim 1, wherein the packet data communication system is an A.S0001/IS-2001 based Access Network system.

4. The method of claim 1 further comprising completing the A10 connection then releasing the A10 connection, wherein the A11-Registration Reply provides a reason for the releasing of the A10 connection.

5. The method of claim 1, wherein the plurality of reasons comprises reason unspecified, administratively prohibited, insufficient resources, mobile node failed authentication, identification mismatch, poorly formed request, unknown PDSN address, and requested reverse tunnel available, requested reverse tunnel is mandatory and 'T' bit not set.

6. In a packet data communication system comprising a base station, a packet control function, and packet data serving node, wherein the base station is coupled to the packet control function by an A8 bearer interface and an A9 signaling interface and the packet control function is coupled to the packet data serving node by an A10 bearer interface and an A11 signaling interface, comprising:
   establishing a connection on the A8 bearer interface;
   establishing a connection on the A10 bearer interface;
   providing an A11-Registration Update message on the A11 signaling interface from the packet data serving node to the packet control function requesting release of the A10 bearer connection;
   providing an A11-Registration Request message on the A11 signaling interface from the PCF to the PDSN requesting release of the A10 bearer connection;

providing an A11-Registration Reply message on the A11 signaling interface from the PDSN to the PCF confirming the release of the A10 bearer connection;

providing an A9-Disconnect-A8 message on the A9 signaling interface from the packet control function to the base station to request release of the A8 bearer connection and provide a reason for the release of the A8 bearer connection; and releasing the A8 bearer connection.

7. The method of claim 6, wherein the A9-Disconnect-A8 message comprises a plurality of possible reasons for release of the A8 connection, wherein the reason for the release of the A8 connection is selected from the plurality of possible reasons.

8. The method of claim 7, wherein the plurality of possible reasons comprises at least point to point (PPP) connection timeout.

9. The method of claim 7, wherein the plurality of possible reasons comprises at least PDSN error.

10. The method of claim 7, wherein the plurality of possible reasons comprises at least PDSN reset.

11. The method of claim 7, wherein the plurality of possible reasons comprises at least PDSN OAM&P intervention.

12. The method of claim 7, wherein the plurality of possible reasons comprises at least inter-PCF handoff.

13. The method of claim 7, wherein the plurality of possible reasons comprises at least inter-PDSN handoff.

14. The method of claim 7, wherein the plurality of possible reasons comprises at least accounting error, Registration Timeout, and Reason Unspecified.

15. The method of claim 6, wherein the packet data communications system is an A.S0001/IS-2001 based Access Network system.

16. The method of claim 6, wherein the A9-Disconnect-A8 message comprises an A9-PDSN code element.

17. The method of claim 6, wherein the A11-Registration Update message provides a reason for the disconnection of the A10 bearer interface selected from a plurality of possible reasons for the disconnection of the A10 bearer interface.

18. The method of claim 17, wherein the A11-Registration Update message and the A9-Disconnect-A8 message comprise an element that comprises a plurality of possible reasons for disconnections of interfaces that bear packet data.

* * * * *